Patented Oct. 3, 1922.

1,431,079

UNITED STATES PATENT OFFICE.

GEORGE WILSON ACHESON, OF NEWARK, NEW JERSEY, ASSIGNOR TO ACHESON CORPORATION, OF NEW YORK, N. Y., A CORPORATION OF DELAWARE.

METHOD OF PREPARING PIGMENT OIL COMPOSITION.

No Drawing.   Application filed August 7, 1922.   Serial No. 580,281.

*To all whom it may concern:*

Be it known that I, GEORGE WILSON ACHESON, a citizen of the United States, residing at Newark, in the county of Essex and State of New Jersey, have invented certain new and useful Improvements in Methods of Preparing Pigment Oil Compositions, of which the following is a specification.

This invention is a novel method applicable in the preparation of pigment suspensions, including paints, inks, varnishes and analogous products comprising a pigment and a vehicle. The pigments employed in accordance with the present invention are preferably subjected to a preparatory treatment by the procedure known as "deflocculation," such procedure involving, as is now well understood by those skilled in this art, the mechanical working of the pigment material in paste form in conjunction with certain organic bodies, such as tannin, extracts from roasted cereals or other starchy materials, etc., known as deflocculating agents. My invention is not however limited to the employment of pigments which have been subjected to deflocculation as above described, but may be practiced, although less advantageously, with any suitable pigment material in a sufficiently fine state of subdivision.

A typical procedure for the preparation of such pigment suspensions in accordance with my invention is as follows, it being however clearly understood that the invention is not restricted to the particular materials, proportions or manipulations set forth by way of example and illustration:

A suitable pigment such for example as ultramarine, zinc white, carbon black or the like is first, preferably, subjected to deflocculation in known manner, whereby it is wholly or partially converted into a colloidal or permanently suspensible condition. The resulting paste is thinned with water to the consistence of a thin cream. In case of pigments existing in a state of sufficient fineness the deflocculation step may be omitted, but the product in such case is distinctly inferior.

This aqueous suspension of the pigment may then be poured with stirring into the vehicle, which may for example be boiled linseed oil or a hydrocarbon oil of the paraffin type. To the resulting emulsion I preferably add just sufficient ammonia so that the characteristic ammoniacal odor persists, and thoroughly stir the mixture.

Or, and preferably, I first emulsify the oil by stirring the same with a dilute aqueous solution of ammonia, and then introduce the pigment suspension with thorough stirring.

However the pigment-oil-water mixture or emulsion may be prepared, I now add a small proportion of any flocculating electrolyte, such for example as a solution of alum or dilute hydrochloric acid, and after stirring allow the mixture to stand until a curd-like precipitate or deposit is formed.

It will be found that these curds consist chiefly of oil and pigment from which the bulk of the water has been eliminated. The excess water may be poured off, and the remaining curds drained, as for instance by changing them into a muslin filter bag or the like. Any residual water may be evaporated off in any suitable way, as for instance by passing the mass through steam heated rolls. The resulting product is ready for packaging, and constitutes a stock material which may be compounded as desired with a variety of oily or other vehicles for the manufacture of paints, inks, varnish preparations or analogous fluid coating compositions.

I claim:

1. Method of preparing pigment-oil compositions comprising preparing an emulsion of oil and water having a pigment suspended therein; co-precipitating the oil and pigment by addition of an electrolyte; and recovering the resulting oil-pigment curd or composition.

2. Method of preparing pigment-oil compositions comprising preparing an emulsion of oil and water having a deflocculated pigment suspended therein; co-precipitating the oil and pigment by addition of an electrolyte; and recovering the resulting oil-pigment curd or composition.

3. Method of preparing pigment-oil compositions comprising preparing an emulsion of oil and ammoniacal water having a pigment suspended therein; co-precipitating the oil and pigment by addition of an electrolyte; and recovering the resulting oil-pigment curd or composition.

4. Method of preparing pigment-oil compositions comprising preparing an emulsion of oil and ammoniacal water having a deflocculated pigment suspended therein; co-precipitating the oil and pigment by addition of an electrolyte; and recovering the resulting oil-pigment curd or composition.

5. Method of preparing pigment-oil compositions comprising preparing an emulsion of an oil and water having a pigment suspended therein; co-precipitating the oil and pigment by addition of an electrolyte; recovering the resulting oil-pigment curd or composition; and eliminating residual water therefrom by evaporation.

6. Method of preparing pigment-oil compositions comprising preparing an emulsion of an oil and water having a deflocculated pigment suspended therein; co-precipitating the oil and pigment by addition of an electrolyte; recovering the resulting oil-pigment curd or composition; and eliminating residual water therefrom by evaporation.

7. Method of preparing pigment-oil compositions comprising preparing an emulsion of an oil and ammoniacal water having a pigment suspended therein; co-precipitating the oil and pigment by addition of an electrolyte; recovering the resulting oil-pigment curd or composition; and eliminating residual water therefrom by evaporation.

8. Method of preparing pigment-oil compositions comprising preparing an emulsion of an oil and ammoniacal water having a deflocculated pigment suspended therein; co-precipitating the oil and pigment by addition of an electrolyte; recovering the resulting oil-pigment curd or composition; and eliminating residual water therefrom by evaporation.

In testimony whereof, I affix my signature.

GEORGE WILSON ACHESON.